(12) United States Patent
Hyatt et al.

(10) Patent No.: US 6,196,773 B1
(45) Date of Patent: Mar. 6, 2001

(54) TOOL WITH CONTROL OF A FLUID AXIS USING REFERENCE INFORMATION FROM OTHER TOOL AXES

(75) Inventors: Gregory Aaron Hyatt, West Chester; Andrew Wilcox; John Pruyn, both of Cincinnati, all of OH (US)

(73) Assignee: Makino Inc., Mason, OH (US)

( * ) Notice: Subject to any disclaimer, the term of this patent is extended or adjusted under 35 U.S.C. 154(b) by 0 days.

(21) Appl. No.: 09/392,091

(22) Filed: Sep. 8, 1999

Related U.S. Application Data
(60) Provisional application No. 60/099,421, filed on Sep. 8, 1998.

(51) Int. Cl.$^7$ ............................................. B23B 39/00
(52) U.S. Cl. .......................... 408/1 R; 82/1.11; 82/1.5; 408/13; 408/16; 408/57; 408/147
(58) Field of Search .................. 408/1 R, 8, 13, 408/16, 57, 59, 147, 156, 154, 155; 82/1.11, 1.2, 1.4, 1.5

(56) References Cited

U.S. PATENT DOCUMENTS

| | | |
|---|---|---|
| 3,937,586 | 2/1976 | Watson . |
| 3,966,347 | 6/1976 | Watson . |
| 3,977,194 | 8/1976 | Klee et al. . |
| 4,067,251 | 1/1978 | Eckle et al. . |
| 4,163,624 | 8/1979 | Eckle . |
| 4,184,391 | 1/1980 | Eckle . |
| 4,224,846 | 9/1980 | Eysel et al. . |
| 4,245,939 | 1/1981 | Sear . |
| 4,350,054 | 9/1982 | Werth, Jr. . |
| 4,387,612 | 6/1983 | Eckle et al. . |
| 4,417,379 | 11/1983 | Goode . |
| 4,443,140 | 4/1984 | Boetto . |
| 4,634,324 | 1/1987 | Eckle et al. . |
| 4,786,217 | 11/1988 | Johne . |
| 4,913,602 | 4/1990 | Peter et al. . |
| 4,933,868 * | 6/1990 | McMurtry ............................. 408/156 |
| 4,941,782 * | 7/1990 | Cook ...................................... 82/1.4 |
| 5,033,918 | 7/1991 | Eysel et al. . |
| 5,116,171 | 5/1992 | Gerk et al. . |
| 5,174,695 * | 12/1992 | Bathen et al. ........................ 408/159 |
| 5,251,511 | 10/1993 | Muendlein et al. . |
| 5,304,019 | 4/1994 | Klee et al. . |
| 5,307,714 | 5/1994 | Muendlein et al. . |
| 5,368,420 | 11/1994 | Gerk et al. . |
| 5,393,177 * | 2/1995 | Cook et al. .......................... 408/147 |
| 5,427,480 | 6/1995 | Stephens . |
| 5,599,146 | 2/1997 | Scheer . |
| 5,655,422 | 8/1997 | Stolz et al. . |
| 5,713,703 | 2/1998 | Gerk et al. . |
| 6,062,778 * | 5/2000 | Szuba et al. ......................... 408/147 |

FOREIGN PATENT DOCUMENTS

| | | |
|---|---|---|
| 0055423 | 7/1982 | (EP) . |
| 323194 * | 2/1972 | (SU) .................................... 408/13 |

\* cited by examiner

Primary Examiner—Daniel W. Howell
(74) Attorney, Agent, or Firm—Dinsmore & Shohl LLP.

(57) ABSTRACT

A tool with a fluid axis wherein the fluid axis is controlled based on reference information from other tool axes, such as positional information relating to other tool axes. The reference information may be directly measured or may be determined from a control program used to control the tool with respect to the other axis or axes. Feedback information from the fluid axis itself, such as fluid pressure of the fluid axis, may also employed as to help determine the reference signal for controlling the fluid axis.

27 Claims, 2 Drawing Sheets

TOOL WITH CONTROL OF A FLUID AXIS USING REFERENCE INFORMATION FROM OTHER TOOL AXES

REFERENCE TO PROVISIONAL APPLICATION

This application claims priority of U.S. patent application Ser. No. 60/099,421, filed Sep. 8, 1998, entitled TOOL WITH CONTROL OF A FLUID AXIS USING REFERENCE INFORMATION FROM OTHER TOOL AXES.

TECHNICAL FIELD OF THE INVENTION

The present invention relates generally to tools utilizing pressurized fluid to actuate tool components and more particularly, to a tool for controlling pressure and/or fluid flow in such tools with a fluid axis.

BACKGROUND OF THE INVENTION

Machine tools generally manipulate a workpiece by actuating and/or biasing tool components in many different directions. For example, one machine tool is a machining center with a removable generating head. As discussed below and in light of this machining center example, each component of motion effected by the machine tool is herein called an "axis."

The generating head can rotate in a rotational direction about its center line so that its blade removes material from a workpiece by physical interference. The rotational position is considered to be one axis of the tool, herein called the rotational axis. Of course, the rotational position of the head is related to the rotational velocity and acceleration, and these quantities are also considered to be part of the rotational axis. Generally speaking, the rotational component of motion effected by the machining center tool is the rotational axis.

The machining center can also actuate the generating head along the longitudinal direction of its centerline, in order to move further in or out of the body of the workpiece. This longitudinal motion is considered to be a second axis of the tool, herein called the longitudinal axis.

In some machining centers, the workpiece can be moved in one or more directions relative to the generating head. The motion (e.g., position acceleration, etc.) of the workpiece in these directions would be additional axes of the machining center tool. Now that the concept of an "axis" has been explained, the use of a "fluid axis" will be discussed below.

In some conventional tools, pressurized fluid can be utilized to help cool, position or provide a biasing force on the operative parts of the tool. For example, U.S. Pat. No. 5,775,853 discloses a squirt reamer wherein hydraulics control the longitudinal position of the squirt reamer head.

As another example, U.S. Pat. No. 4,913,602 to Peter et al. discloses a boring head for treating or cutting of hollow cylinder surfaces with a cutting edge that is radially adjustable by means of hydraulic pressure. The hydraulic pressure, and the radial adjustment effected thereby, can be considered to be the fluid axis of this boring head tool.

As used herein, the term reference information means any information used in controlling a tool axis. Feedback, which is derived from the controlled axis itself, is one kind of reference information. Conventionally, some tools control a fluid axis based upon feedback reference information to effect closed loop servo control of the fluid axis (e.g., fluid pressure). However, the feedback reference information employed in this closed loop servo control is generally limited to the fluid pressure itself. Of course, feedback reference information based on the actual fluid pressure can be usefully employed to control the fluid pressure to maintain some constant, predetermined pressure value.

However, fine adjustments and continuous adjustments to the fluid axis can not be made based on the other axis of the tool, because the values (e.g., positions, velocities, etc.) related to the other axes of the tool are not employed as reference information in control of the fluid axis.

It is advantageous to use only fluid axis feedback information to effect closed loop servo control of a fluid axis. This kind of control requires relatively infrequent binary signals to be sent between the computerized numeric control (CNC), which controls the electromechanical components of the tool, and the fluid regulation hardware (e.g., a valve). For example, a low speed serial interface can be used between a CNC and fluid regulation hardware.

SUMMARY OF THE INVENTION

It is an object of the present invention to provide a tool that addresses and overcomes the above-mentioned procedures and short comings in this industry.

It is also an object of the present invention to provide a tool effecting control of a fluid axis based at least in part on reference information (e.g., positional information) from at least one other axis of the tool.

It is a further object of the present invention to provide a tool where fine adjustments to fluid flow and or pressure can be made continuously, even during the period that the tool is operating on a workpiece.

Additional objects, advantages and other features of the present invention will be set forth and may become apparent to those skilled in the art upon examination of the following, or may be learned with practice of the invention.

In some embodiments of the present invention, the reference information from the other axis will be supplied by a control program executed in a computer. In some embodiments of the present invention, the reference information from the other axis will be supplied by measurement on the other axis.

In some embodiments of the present invention, a fluid axis transducer, which measures the operation of the fluid axis, provides feedback information which can be used to help determine the reference signal in conjunction with reference information relating to at least one other tool axis. By using feedback information from the fluid axis itself in determining the reference signal, closed loop control of the fluid axis can be effected.

According to some embodiments of the present invention, a tool having a fluid axis and actuation along an additional axis includes a reference signal generator, a fluid conduit, a fluid regulation device, and a fluid regulation controller.

The reference signal generator is structured to determine a reference signal based at least in part on operation of the tool with respect to the additional axis. For example, the additional axis may be the longitudinal position of a generating head, while the reference signal to control the fluid axis may be determined at least in part on this longitudinal position. One way to implement this example is to utilize a computerized numeric controller, which also controls the longitudinal position of the generating head, as the reference signal generator and to obtain information from the head control program to help determine the reference signal for the fluid axis.

The fluid conduit is structured to contain pressurized fluid which pressurized is utilized as the fluid axis. For example, the fluid conduit may be a through spindle coolant conduit which runs from a fluid supply, through a tool spindle and rotating generating head, and out through a fluid exit. In this example, the fluid can be used both to bias or actuate portions of the tool (e.g., a generating blade cartridge) and to cool the interface between the tool and a workpiece.

The fluid regulation device is structured to regulate the fluid in the fluid conduit and thereby control the fluid axis. For example, the fluid regulation device may be a valve which can be opened and closed by degrees to control the fluid pressure in the fluid conduit and thereby, control the fluid axis. As a further example, the fluid axis may be a variable speed pump which can pump fluid through the fluid conduit at a controlled volumetric flow rate to thereby control the fluid axis.

The fluid regulation controller is structured to control the fluid regulation device based on the reference signal. For example, the fluid regulation controller may be a servo motor, which opens or closes a valve. As a further example, the fluid regulation controller may be the speed control of a variable speed pump. In either case, the reference signal look is based at least in part on the operation of at least one other axis of the tool. In this way, the fluid axis can be continuously and simultaneously controlled with respect to one or more of the other axes of the tool.

Some preferred embodiments of the present invention further include a fluid axis transducer structured and located to measure operation of the tool with respect to the fluid axis, wherein the reference signal generator determines the reference signal based in part on the measurement of the fluid axis transducer. For example, the fluid axis transducer may be a pressure transducer located to measure pressure in the fluid conduit and to provide feedback based on the measured pressure. This feedback information is used to help the reference signal generator (e.g., a computerized numeric controller) determine the reference signal (in conjunction with information from at least one other tool axis) and thereby control the fluid axis. Because these embodiments use feedback from the fluid axis itself, they provide closed loop control of the fluid axis.

It is a further object of some embodiments of the present invention to provide a tool having a fluid axis controlled based at least in part on a reference measurement supplied from a transducer located on a portion of the tool which moves relative to the fluid axis control hardware. For example, the transducer may be a strain gauge which makes a reference measurement of a radial position of a portion of a rotating head to help control the fluid axis. In preferred embodiments, the measurement will be converted into a remote signal (e.g., radio frequency signal or infrared signal) to facilitate sending the signal between portions of the tool which move relative to each other. For example, a remote signal may be sent from a rotating reamer head to a computerized numeric controller mounted on a stationary machining center.

BRIEF DESCRIPTION OF THE DRAWINGS

While the specification concludes with the claims particularly pointing out and distinctly claiming the present invention, it is believed that the same will be better understood from the following description taken in conjunction with the accompanying drawings, in which:

DETAILED DESCRIPTION OF PREFERRED EMBODIMENTS

Figure 1:
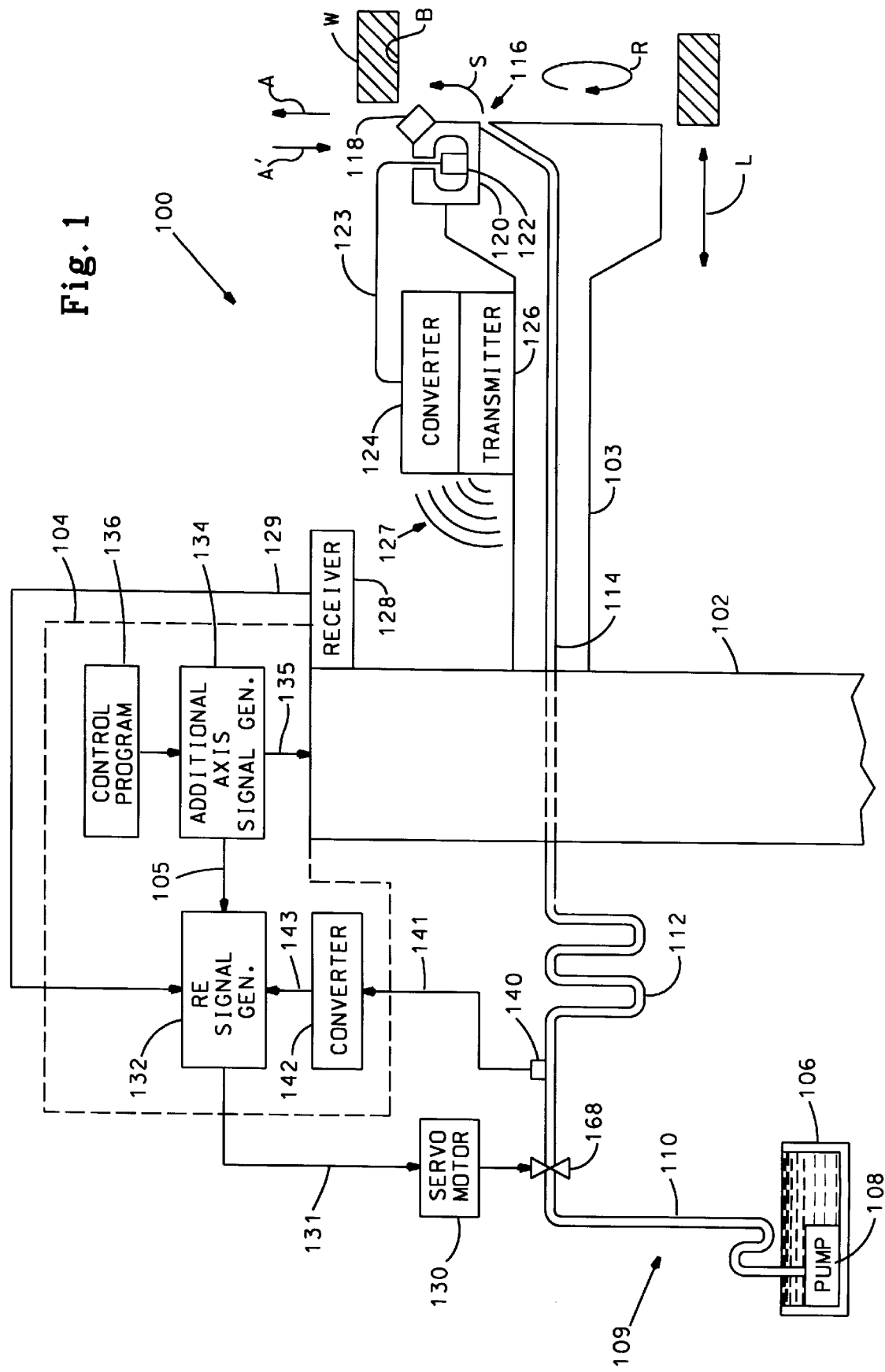
FIG. 1 is a diagram of an embodiment of a machining center tool with a generating head according to the present invention.

Referring now to the figures in detail, wherein like numbers indicate the same element throughout the views, FIG. 1 illustrates machining tool center 100 according to the present invention that includes a base 102, a computerized numerical controller (CNC) 104 in the form of a programmed computer, a fluid delivery system 109 including a fluid reservoir 106, and/or a fluid pump 108. A workpiece W is typically mounted on fixture or workhead using techniques and fixtures known in the industry. Workpiece W is exemplified in the FIG. 1 as having a bore hole B or similar hollow interior portion. A tool (e.g., 103) for machining the workpiece W is generally attached to the machine tool center 100 using a machine spindle (not shown) for quickly and easily receiving and securing one of a plurality of different tools for various operations. The machine tool center 100 may also include a synchronized system, such as an automatic tool changing system, for quickly and easily interchanging and utilizing a plurality of different tools at one machine tool center 100, thereby allowing the machine tool center 100 to provide greater utility or range of operations such that it is not dedicated to a single operation or use of a single type of tool. The machine spindle can be rotated at varying speeds by a power source.

The CNC 104 can control the base 102 to actuate the generating tool 103 in the rotational direction R, in the longitudinal direction L, radial axis A, and/or, other axes of control. By virtue of the rotational motion in the R direction, the generating tool 103 can spin preferably about its longitudinal center line, so that its blade 118 removes material from the workpiece W. This rotational motion and resultant position is the rotational axis of a tool 103. By virtue of the longitudinal motion in the L direction, the generating tool 103 moves into and out of the workpiece W in order to cut deeper into the workpiece W, and/or to retract therefrom. This longitudinal motion and the resultant position of generating tool 103 is the longitudinal axis of a tool.

Tool 103 also can have a radial axis A, which is controlled by pressurized fluid. More particularly, pressurized fluid in conduit 114 formed in generating tool 103 can bear on, bias and actuate slotted blade cartridge 120 in the substantially radial direction A. This in turn can bias and/or actuate blade 118 in the radial direction A, and thereby can control the radius of hole B bored in a workpiece W by rotating blade 118. Because the axis A is controlled by pressurized fluid, it can be a fluid axis of the tool 103.

In other tools according to the present invention, the fluid axis may or may not correspond with a radial direction A. For example, pressurized fluid can be used to control tool movement in the longitudinal or other directions.

Reservoir 106 of the present invention can contain cooling fluid, and pump 108. A wide variety of water emulsified or soluble coolant fluid may be used to provide the pressurized fluid in the fluid conduit 114, as long as the fluid selected is compatible with the desired level of filtration. It is also noted that a high level of coolant fluid filtration is preferred for the present invention, with particle sizes down into the 5 to 10 micron range. Also, protein based water soluble coolant fluid or straight oil can be used as the coolant fluid.

Pump 108 can be, for example, a screw pump, a gear pump, a piston pump or a diaphragm pump. A pump 108 with a relatively high operating frequency, such as 300 Hz, may be useful to help minimize variations in the rate of pumping. Furthermore, a damper (e.g., a muffler or accumulator) may be used with certain pumps so that the output can be leveled, as desired, and/or so that the fluid output can be dampened.

As explained above, coolant pressure, coolant volumetric fluid flow, tool axial diameter, etc. can be used as fluid axis feedback to the CNC 104. In the case of tool axial diameter feedback, a transducer 122 such as a position transducer will output a feedback reference signal through various intermediate components such as remote signal components (e.g., transmitter 126 and receiver 128) to the CNC 104. In the case of coolant pressure feedback, a pressure transducer 140 can be placed in the coolant line. This transducer 140, such as a thin-membrane transducer, preferably will have a quick response time in order to provide enough data to control the valve at 125 Hz. A transducer with very low hysteresis is required to accurately control the valve since the coolant pressure will probably fluctuate rapidly over a small pressure range. The transducer should have a range from 0 to approximately 1500 psi. An off-the-shelf-transducer can be used such as the Sensotec Super-TJE Series.

Pump 108 can pump or feed cooling fluid through feed pipe 110, hose 112 and conduit 114. Hose 112 is preferably flexible in orderto accommodate longitudinal motion L of the generating head 103. In this way, through spindle cooling (TSC) can be provided. The pressurized fluid bears on blade cartridge 120 (as explained above), and then escapes through fluid exit 116 in the vicinity of the blade 118. At least some of the cooling fluid splashes out of the fluid exit 116 in the direction of arrow S in order to provide cooling. In other embodiments of the present invention, a closed hydraulic system is used so that fluid exit 116 may not be required. Also, the pressurized fluid of the present invention does not need to be in the form of a fluid, but incompressible fluids are preferred.

The pressure of the pressurized fluid in the fluid conduit 114 and hose 112 can be, and is preferably, directly and selectively controlled by flow regulating device 168, which can be located or positioned in the feed pipe 110. In a preferred embodiment, the flow regulating device 168 may be provided closer to the generating tool 103 in order to improve response time of the feedback system. The flow regulating device 168 generally opens to a greater extent to increase the downstream pressure of fluid in conduit 114 and thereby, can push blade 118 further out in the radial direction A. The flow regulating device 168 generally closes to a greater extent to decrease the downstream pressure of fluid in fluid conduit 114 and thereby, allows blade 118 to retract in the counter-radial direction A'.

The flow regulating device 168 of the present invention, such as a valve, is preferably a hydraulic proportioning valve with a tapered orifice, but other valves, such as ball valves and gate valves are also possible. The flow regulating device 168 embodied by valve can be mounted on a tee off of the spindle coolant line. This device 168 will control the amount of flow that is dumped back into the coolant reservoir 106, thereby controlling the pressure of the coolant that goes to the fluid conduit 114. This device 168 can be a 3-way flow control spool valve (normally open) with a rated flow of approximately 20–30 gallons per minute ("gpm"). A small amount of flow from the pump 108 will be used to pressurize one side of the spool in order to overcome enough spring force to bring the spool to the middle of its stroke. With the spool in equilibrium in the middle of its stroke, the force required to move it is minimized.

A pressure-relief valve (not shown) set generally from about 200 pounds per square inch ("psi") to about 3000 psi, and preferably from about 200 psi to about 1000 psi can be placed on the spindle coolant line after the tee to the flow regulating device 168. A normally open two-way valve (either poppet or spool valve, not shown) can be used on the main coolant line to the spindle placed after the pressure relief valve. This valve can temporarily shut off fluid flow to the spindle when fluid is not required, such as during a tool changing operation, or during a dry machining operation.

The opening and closing of the flow regulating device 168 can be selectively actuated by a servo motor 130, or even manually.

Preferably, the servo motor 130 should have low inertia and a high torque to inertia ratio. The servo motor 130 is preferably hard-coupled to the valve 168. The servo motor 130 should be chosen to be compatible with the CNC 104 used in the particular machine center 100. In some embodiments, the signal format of reference signal 131 must be converted between a reference signal generator 132 and the motor 130.

The type and size of servo motor 130 used completed depends on the type of valve 168 used to control the fluid pressure. Most proportional valves utilize a linear spool that moves back and forth to divide the flow between several ports. In this application, the flow regulating device 168 (e.g., spool valve) could be used to control the amount of flow dumped back to the coolant reservoir 106. A linear motor 130 would be suited to actuate this type of flow regulating device 168 since energy wasted converting rotary motion to linear motion can be minimized. The stroke should be less than one inch and the force required to overcome friction is very low so a relatively small linear motor 130 can be used. The required input force depends almost entirely on the desired acceleration of the valve.

The flow regulating device 168 should be designed to operate at frequencies up to 125 Hz, so high accelerations will be required to make the device 168 respond quickly. The spool should have a weight greater than 8–10 oz. (¼ Kgf), so the linear motor 130 will need a continuous force equal to the mass of the spool+slider assembly $(Kg)*9.2$ $m/s^2 *$ acceleration (g). The Fanuc model 1500A linear motor has a continuous force rating of 300N and a slider weight of 8 Kg, which is enough for continuous acceleration at 3.7 g.

A rotary servo motor 130 could be used with flow regulating device 168 (e.g., spool valve) by converting rotary to linear motion by a number of methods including ball screw, rack and pinion, or directly driven by an "eccentric" on the motor shaft. The motor 130 size depends upon the relationship between the rotary motion of the motor 130 and the resulting linear motion of the flow regulating device 168. The rotary inertia of the motor 130, connecting components, and the reflected inertia of the spool must be used to determine the required torque of the motor 130 for a given spool acceleration. The motors which have been considered for this application have between 0.6 to 3.0 $N*m$ of continuous torque and rotary inertia values between 0.00018 to 0.014 $Kgf*cm*s^2$.

The servo motor 130 can be in turn controlled by reference signal 131 from a reference signal generator 132 located in the CNC 104. The reference signal 131 is preferably sent from the reference signal generator 132 to the servo motor 130 over a line to exchange response time of the feedback system. Non-limiting examples or might be used a line include a high speed serial interface, a fiber optic cable, or the like.

According to the present invention, the reference signal 131 is based at least on reference information from one of the other axes of the tool 103, other than the fluid axis itself. In this way, the fluid axis can be continuously and simultaneously controlled with reference to the other tool axes. For example, in tool 103, the radial fluid axis can be controlled based on the longitudinal position of the tool 103, the longitudinal axis L, in order to allow fine and continuous control of the radius of a bore (e.g., B) based on longitudinal location. The control of the radius can be used to control the profile of the bore (e.g., B) along its depth or to compensate for observed deformation patterns for a given type of workpiece W.

The control of the fluid axis of tool 103 will now be described in more detail. Additional axis generator 134 in CNC 104 can generate tool control signals 135 based preferably on a control program 136 (also preferably located in the CNC 104). These control signals 135 can control many other things such as the rotation speed (i.e., the rotational axis) and the longitudinal position (i.e., the longitudinal axis) of the tool 103 relative to the workpiece W.

According to the present invention, additional axis signal generator 134 can also sends an additional axis reference signal 105 to the reference signal generator 132. The additional axis reference signal 105 can correspond with the longitudinal position L of the tool 103 as controlled by the additional axis signal generator 134 and the control program 136. Alternatively, an additional axis reference signal 105 could be determined and sent by a position transducer, which measures actual longitudinal position of tool 103. The additional axis reference signal 105 is preferably sent by means of a remote signal 127 (e.g., an infrared signal, a radio frequency signal or inductive signal).

The reference signal generator 132 can use this additional axis reference signal 105 in determination of the reference signal 131. For example, the reference signal 131 may be programmed so that as longitudinal depth of the tool 103 progresses from about 0 to about 1 inch, the radius of the bore (e.g., B) decreases from about 4.01 to about 4.00 inches in order to compensate for material deformation near the surface of a workpiece W. Other kinds of control algorithms are possible within the CNC, such as radial control with longitudinal position to other bore profiles, counter sinks, spot faces, 3 facet valve seats, and discontinuities.

In addition to the reference information from the additional axis (e.g., the longitudinal axis), the reference signal generator 132 may use other reference information, such as feedback from the fluid axis itself. Machining tool center 100 can provide for two separate paths for feedback information to be provided to the reference signal generator 132. It is noted that while two feedback paths are provided in center 100 exemplified in FIG. 1, one feedback path will generally be sufficient to provide feedback for the present invention.

The first feedback path can include a sensor 140, such as a transducer or conditioner, and preferably a pressure transducer, and a data converter 142, preferably either on A-quad-B converter or a serial converter.

The analog signal from the pressure transducer 122 (volts or mA) can be converted to A-quad-B format before the CNC 104 can use it. A-quad-B is an industry standard for positional feedback systems, and can consist of a two-phase square wave. The CNC 104 interprets each pulse to mean that the machine has traveled a certain distance called the detect unit. In the fluid axis servo control application of tool 100, the detect unit will be a several psi change in coolant fluid pressure. The transducer 122 will output either a voltage or current proportional to the measured fluid pressure.

The A-quad-B converter 142 receives the feedback reference signal in analog form 141 and outputs the correct number of pulses in A-quad-B format. Ideally the pulses should be evenly spaced in time, but if necessary they can be bunched together each time the converter samples the feedback reference signal 141. Specifications for the feedback reference signal in A-quad-B format are included. A custom converter may be required, however several off-the-shelf products can convert analog to A-quad-B format. One such converter is the ILC Data Device Corporation model number ADC-00300. The ADC-00300 will emulate A-quad-B if two of the LSB's are tied together with an exclusive OR gate.

The sensor 140 can measure the fluid pressure downstream of the flow regulating device 168 and can convert this pressure to a feedback reference signal 141, in binary (e.g., digital) or analog form. It is noted that a volumetric flow transducer can be used instead of a pressure transducer with the present invention, although compensation for temperature changes may be required in this case.

The feedback reference signal 141 is sent to the data converter 142, where it can be converted into A-quad-B format or a serial format, depending on the desired application. In center 100, the data converter 142 is preferably located or positioned in the CNC 104. However, the data converter 142 of the present invention may alternatively be provided as a separate component from the center 100. Data converter 142 generally sends the feedback reference signal 141 in the desired format 143 to the reference signal generator 132 so that reference signal generator 132 can provide closed loop control.

While the additional axis information may be used to determine a nominal bore radius (and corresponding fluid pressure, corresponding fluid regulating device 168 position, and/or corresponding servo motor 130 position), the feedback reference information can help the reference signal generator 132 maintain or keep the bore radius as close to the nominal position as possible, notwithstanding small transient phenomena, such as variations in the pump speed or changes in fluid feed caused by partial blockage of the fluid path and/or bending of the hose 112.

The second path for feedback reference information includes sensor, such as a strain gauge 122, a data converter 124, a remote transmitter 126 and remote receiver 128. Strain gauge 122 measures small deformations in a wall of the blade cartridge 120, which correspond to the radial position A of the blade 118 and to the fluid pressure. Strain gauge 122 can send feedback reference signal 123 to data converter 124 in the form of binary or digital data.

In other embodiments of the present invention, different of types of transducers to measure positions of parts of the tool can provide various reference information for use in tool control. For example, optical transducers or LVTD transducers could be used to measure positions of the blade 118 or blade cartridge 120. Other parameters which may be measured and used as reference information include degree of spindle spread, longitudinal position of a tool member, spindle velocity, heat generated by the tool 103, location of the workpiece W and so on.

Also, the reference information provided by the transducer is not necessarily position information in the form of a positional value within a continuous range. For example, the transducer may be a contact switch which opens or closes upon some predetermined event and accordingly sends a block skip signal which the CNC can use to control the fluid axis or other axes.

Data converter 124 converts the feedback reference signal to A-quad-B format or serial format, depending on the data converter, so that remote transmitter 126 can transmit the feedback reference signal in the form of a remote signal 127. For example, the remote signal 127 may be in the form of electromagnetic waves (such as infrared or radio frequency waves), or in the form of an electrical inductive signal. The feedback reference signal in the form of a remote signal 127 is then received by remote receiver 128, which is connected to the base 102 or the CNC 104.

The transmission of the feedback reference information as a remote signal 127 can be helpful because the feedback transducers which measure tool actuation (in this embodiment, for example, radial actuation of a blade 118) will often be in motion with respect to control devices, such as a CNC 104. In this example, strain gauge transducer 122 is generally moving in the rotational R and longitudinal L directions with respect to the CNC 104. The remote nature of the feedback signal facilitates transmission of the signal between components in relative motion. It is noted that the use of remote transmission of reference data from a moving tool 103 the control circuitry of the machine center (e.g., 100) is not limited to the radial position feedback reference information thus transmitted in tool 100.

After remote receiver 128 receives the feedback reference signal in the form of a remote signal 127, the receiver 128 can convert the feedback reference signal back to the form of an electrical signal 129 and sends the feedback reference signal 129 to the reference signal generator 132 for use in controlling the servo motor 130 and flow regulating device 168.

As explained above, in machining center 100, reference information from an electromechanical rotational axis and an electromechanical longitudinal axis can be used to control a radial fluid axis. However, the present invention is not limited to this application. The fluid axis, which is controlled with reference to at least one of the other axes, is not necessarily a radially-directed axis. Furthermore, the reference information does not necessarily come from a longitudinal axis or even necessarily come from an electromechanical axis. Moreover, the present invention is not limited to tools having a reamer geometry with a rotating blade.

Figure 2:
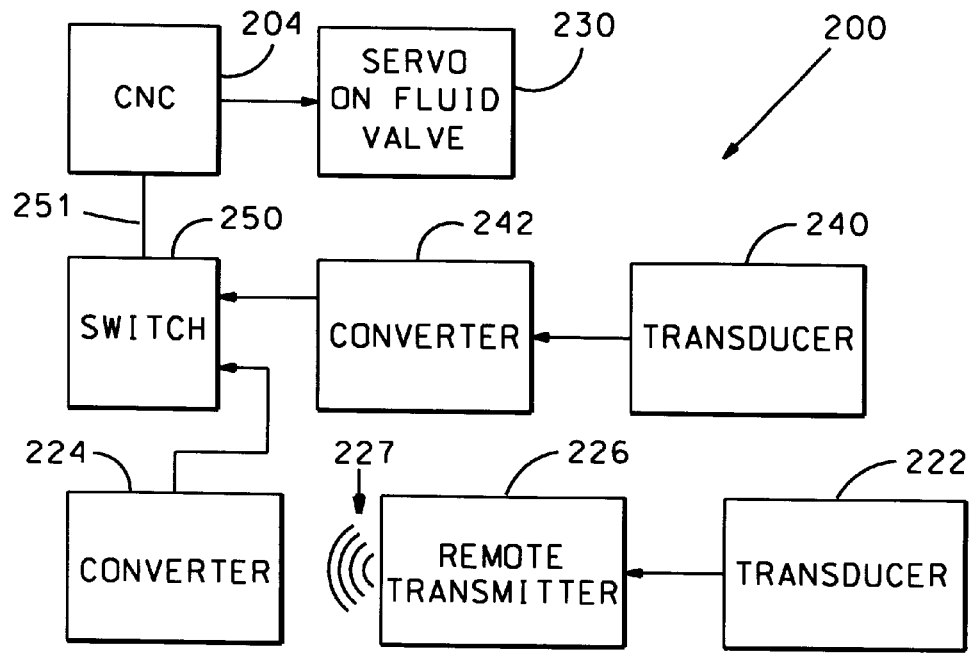
FIG. 2 is a diagram of an alternative embodiment of a tool according to the present invention.

FIG. 2 shows a block diagram of alternative embodiment of a tool 200 according to the present invention. The CNC 204, servo motor 230, transducer 240, such as a pressure transducer, a converter 242, such as an A-quad-B convertor, and a transducer 222, such as a position transducer, are similar to their corresponding elements in tool 100 and will not be further explained. In the present embodiment, the converter 224 (which also acts as a remote receiver for remote signal 227) is placed on the other side of remote transmitter 226.

Also, tool 250 can include switch 250 so that feedback reference information can be selectively supplied from the transducer 240 and/or the transducer 222. Switch 250 selects feedback reference data from one of these two paths and send an appropriate feedback reference signal 251 to the CNC 204.

Figure 3:
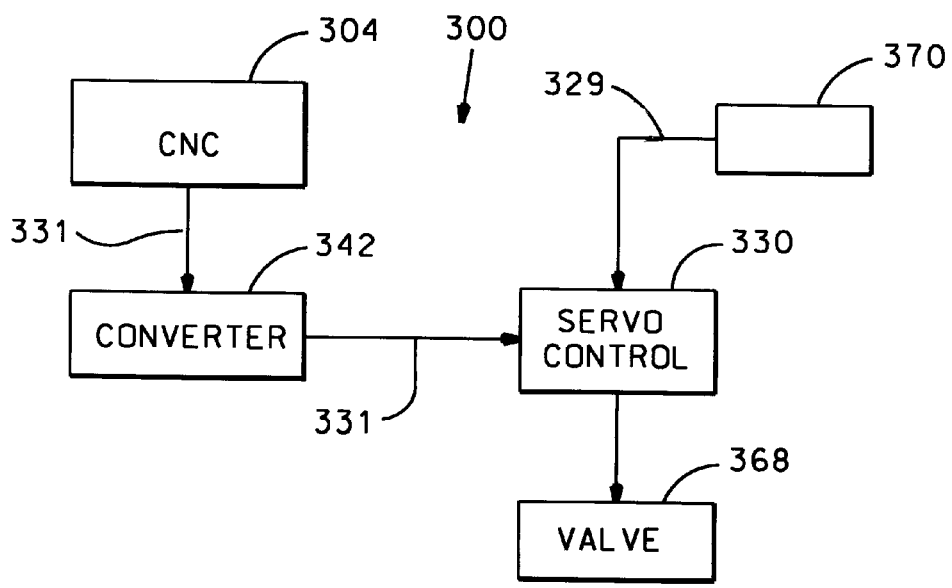
FIG. 3 is a diagram of another alternative embodiment of a tool according to the present invention.

FIG. 3 exemplifies yet another alternate embodiment of the present invention of tool 300. Reference signal (e.g., 331) can be transmitted to a convertor 342, such as a digital to analog convertor, if necessary, to convert the digital signal to an analog signal. Then, reference signal 331 is transmitted to servo motor 330. The feedback reference signal 329 from the remote assembly 370 (e.g., sensor, transmittal and/or receivor) is transmitted to the servo control 330 for use in controlling flow regulating device 368.

The foregoing examples and various preferred embodiments of the present invention set forth herein are provided for illustrative purposes only and are not intended to limit the scope of the invention defined by the claims. Additional embodiments of the present invention and advantages thereof will be apparent to one of ordinary skill in the art and are within the scope of the invention defined by the following claims.

What is claimed is:

1. A tool having a fluid axis and actuation along an additional axis, the tool comprising:

a reference signal generator structured to determine a reference signal based at least in part on operation of the tool with respect to the additional axis;

a fluid conduit structured to contain pressurized fluid which is utilized as the fluid axis;

a fluid regulation device structured to regulate the fluid in the fluid conduit and thereby control the fluid axis; and a fluid regulation controller structured to control the fluid regulation device based on the reference signal.

2. The tool according to claim 1, comprising a fluid axis transducer structured and located to measure operation of the tool with respect to the fluid axis, wherein the reference signal generator determines the reference signal based in part on the measurement of the fluid axis transducer.

3. The tool according to claim 2, comprising an A-quad-B converter structured to receive the measurement of the fluid axis transducer in a non-A-quad-B format and to convert the measurement into an A-quad-B format.

4. The tool according to claim 2, comprising a serial convertor structured to receive the measurement of the fluid axis transducer in a non-serial format and to convert the measurement to a serial format.

5. The tool according to claim 2, wherein the fluid axis transducer comprises a pressure transducer structured and located to measure pressure of the fluid in the fluid conduit.

6. The tool according to claim 2, wherein the fluid axis transducer comprises a fluid flow transducer structured and located to measure volumetric fluid flow in the fluid conduit.

7. The tool according to claim 2, wherein the fluid axis transducer comprises a position sensor structured and located to measure the position of portions of the tool actuated along the fluid axis.

8. The tool according to claim 2, wherein the fluid axis transducer comprises a strain sensor structured and located to measure the strain in portions of the tool actuated along the fluid axis.

9. The tool according to claim 1, wherein the reference signal generator comprises a computerized numeric controller structured and programmed to control operation of the tool with respect to the additional axis according to a control program and to determine the reference signal based at least in part on the control program.

10. The tool according to claim 1, wherein the feedback device comprises an additional axis transducer structured and located to measure operation of the tool with respect to the additional axis and to determine the reference signal based at least in part on the measurement of the additional axis transducer.

11. The tool according to claim 1, comprising:

a fluid supply structured to supply the fluid to the fluid conduit; and a fluid exit in fluid communication with the fluid conduit structured to allow the fluid to flow from the fluid conduit to the exterior of the tool;

wherein the fluid flows from the fluid supply through the fluid conduit to the fluid exit.

12. The tool according to claim 11 wherein the fluid is a coolant.

13. The tool according to claim 1 wherein the fluid regulation device is a valve located in the fluid conduit structured to be opened and closed under control of the fluid regulation controller.

14. The tool according to claim 1 wherein the fluid regulation device comprises a pump structured and located to pump fluid through the fluid conduit at a volumetric flow rate controlled by the fluid regulation controller.

15. The tool according to claim 1 wherein the fluid regulation controller is a servo motor structured to actuate the fluid regulation device based on the reference signal.

16. The tool according to claim 1 wherein the fluid is a liquid.

17. The tool according to claim 1 further comprising a rotating blade, wherein the fluid axis of the tool is a radial position or bias of the blade which is determined by fluid pressure of the fluid in the fluid conduit.

18. The tool according to claim 1 further comprising a rotating reamer head, wherein the additional axis of the tool is a longitudinal position of the reamer head.

19. A method of controlling a tool having a fluid axis and an additional axis, the method comprising the steps of:

generating a reference signal based at least in part on tool operation with respect to the additional axis; and controlling the fluid axis based the reference signal.

20. The method according to claim 19 further comprising the step of:

determining the reference signal so that it is based in part on tool operation with respect to the fluid axis, whereby the fluid axis is controlled in a closed loop manner.

21. A tool having a fluid axis, the tool comprising:

a fluid conduit structured to contain pressurized fluid which is utilized as the fluid axis;

a fluid regulation device structured to regulate the fluid in the fluid conduit and thereby control the fluid axis;

a fluid regulation controller structured to control the fluid regulation device based on a reference measurement signal;

a tool member structured to move in at least one direction relative to the fluid regulation controller;

a transducer constrained to move with the tool member and structured to measure a reference measurement based on actuation of the tool member and to generate the reference measurement signal .

22. The tool according to claim 21, further comprising:

a remote transmitter constrained to move with the tool member and structured to receive the reference measurement signal from the transducer and to transmit the reference measurement signal in the form of a remote signal; and a remote receiver constrained to move with the fluid regulation controller and structured to receive the reference measurement signal in the form of a remote signal.

23. The tool according to claim 22, wherein the remote signal comprises an optical signal.

24. The tool according to claim 22, wherein the remote signal comprises an electrical inductive signal.

25. The tool according to claim 22, wherein the remote signal comprises radio frequency signal.

26. The tool according to claim 21, comprising an A-quad-B converter structured to receive the reference measurement signal in a non-A-quad-B format and to output the reference measurement signal in an A-quad-B format.

27. The tool according to claim 21, comprising a serial converter structured to receive the reference measurement signal in a non-serial format and to output the reference measurement signal in a serial format.

* * * * *